United States Patent
Cannon et al.

(10) Patent No.: US 6,493,429 B1
(45) Date of Patent: Dec. 10, 2002

(54) TELEPHONE WITH ABILITY TO PUSH AUDIBLE READ OUT DATA

(75) Inventors: Joseph M. Cannon, Harleysville, PA (US); James A. Johanson, Macungie, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/448,932

(22) Filed: Nov. 24, 1999

(51) Int. Cl.[7] .......................... H04M 1/64; H04M 11/00
(52) U.S. Cl. ................. 379/88.01; 379/67.1; 379/87; 379/88.04; 379/88.16; 379/93.15; 379/100.13
(58) Field of Search ............................ 379/67.1, 88.01, 379/88.11, 88.14, 88.16, 88.27, 43.15, 93.17, 93.23, 93.35, 100.13, 142.08, 211.02, 212.01, 215.01, 265.01, 266.04, 88.04, 87

(56) References Cited

U.S. PATENT DOCUMENTS

| | | | | |
|---|---|---|---|---|
| 5,007,076 A | * | 4/1991 | Blakley | 379/67 |
| 5,325,421 A | * | 6/1994 | Hou et al. | 379/67 |
| 5,651,056 A | * | 7/1997 | Eting et al. | 379/88 |
| 5,822,402 A | * | 10/1998 | Maeszalek | 379/67 |
| 5,903,628 A | * | 5/1999 | Brennan | 379/88.21 |
| 6,018,568 A | * | 1/2000 | Furman et al. | 379/93.15 |
| 6,049,594 A | * | 4/2000 | Furman et al. | 379/67.1 |

\* cited by examiner

*Primary Examiner*—Allan Hoosain
(74) *Attorney, Agent, or Firm*—William H. Bollman

(57) ABSTRACT

In one embodiment according to the invention, a telephonic apparatus includes an interface to a network, a memory adapted to store a telephone number, a text-to-speech module adapted to produce audible signals associated with the stored telephone number, a processor, and a local input unit. The local input unit is adapted to produce an input signal in response to user activation, and the processor is adapted to respond to the input signal by retrieving the stored telephone number from the memory and causing the text-to-speech module to produce the audible signals for transmission to the network via the interface. In an alternative embodiment according to the invention, a method of transmitting Caller ID data to a distant party includes the steps of receiving a local input command, retrieving stored Caller ID data in response to the local input command, producing audible signals based on the retrieved Caller ID data, and transmitting the audible signals to the distant party.

25 Claims, 2 Drawing Sheets

TELEPHONE WITH ABILITY TO PUSH AUDIBLE READ OUT DATA

FIELD OF THE INVENTION

The invention is related to the field of telephony, and in particular to a telephone or adjunct box related thereto that stores data.

BACKGROUND OF THE INVENTION

Modern telephones and adjunct boxes associated therewith store many forms of data, such as Caller ID data associated with incoming calls and speed dial data associated with particular speed dial buttons. Speed dial data is typically provided by a user. For example, the user may be provided the option to program one or more speed dial buttons associated with a telephone such that the user may subsequently place an outgoing telephone call merely by activating one or a few buttons.

Caller ID data, on the other hand, is typically received from a network as part of an incoming telephone call. According to the Caller ID feature, data is associated with the incoming telephone call to provide the called party some information regarding the calling party, in particular, information regarding the calling party's telephone. The called party typically has an adjunct box, or a "feature-phone" with the adjunct box functionality incorporated therein, with a liquid crystal display that provides the called party with the information as the incoming call is being received. In the United States, the Caller ID information is typically provided between the first ring signal and the second ring signal, as described in Belicore standard GR-30-CORE, incorporated herein by reference.

Alternatively, if the called party is engaged in a first telephone call while a second telephone call is being received, the called party may receive Caller ID with Call Waiting (CID/CW, or Type II Caller ID) information during a muting period as governed by Bellcore standard GR-30-CORE, incorporated herein by reference, or alternatively according to the procedure defined in U.S. Pat. No. 5,943,407, incorporated herein by reference. Similar standards, albeit not necessarily identical to the U.S. standards, are applicable in other countries.

An attribute of Caller ID is that it enables a called party to screen incoming calls by determining, based on the information presented, whether the called party wants to take time to engage in a conversation with the incoming caller, or to have the call go unanswered or forwarded to an answering machine. An additional advantage is that the called party can benefit from a record of the stored Caller ID data to use as a simple look-up device when returning a call to the incoming caller.

For example, the called party can scroll through the Caller ID data accumulated for a plurality of incoming calls by activating one or more keys of a telephone keypad while observing information presented on the Caller ID display. When the information that the called party is looking for appears on the display, the called party can place a return telephone call by dialing the displayed number (by activating the corresponding keys), or in some telephones may simply press a key associated with the Caller ID display to automatically cause the displayed telephone number to be called.

The opportunity to use preprogrammed speed dial buttons to place an outgoing call, or to scroll through stored Caller ID telephone numbers as part of placing an outgoing call may be habit-forming, especially for a user of a Caller ID device that enables an outgoing call to be automatically initiated upon the activation of a single key when the target telephone number is displayed. One proposed improvement to the existing technology is to make it accessible remotely, such that a user may call in to the user's telephone to review stored Caller ID data associated with one or more incoming calls, and to subsequently initiate an outgoing call to a particular party.

A disadvantage of this proposed improvement is that it may interfere with normal conversation flow if a user is calling in to find a stored telephone number and the incoming call is answered by, for example, a member of the user's family. In such a circumstance, the user has a few options. A first option is for the user to tell the answering party that the user wishes to terminate the present call, and to subsequently place a new call that the user does not want the answering party to answer. This process will enable the user to call in and review the stored Caller ID data or speed dial information.

An alternative option is for the user to ask the answering party to review the Caller ID or speed dial data, locate the proper record or records, and to verbally provide the information contained in the record(s) to the user as part of the telephone call. This alternative option is advantageous in that it doesn't require the user to place a new incoming telephone call to obtain the data, and potentially a third incoming telephone call to continue the conversation. However, this option may be inconvenient to the answering party in that, once a record is retrieved, the answering party must write the information down or memorize it, if the telephone used by the answering party is not proximate to the display. Similar actions may be necessary if the display is integral to a handset used by the answering party because such a configuration may make it inconvenient for the answering party to simultaneously review the data and engage in the conversation. There is a need, therefore, for a method to enable an answering party to easily send the data out to the incoming caller while engaged in a telephone call.

SUMMARY OF THE INVENTION

This need is met, in one embodiment according to the invention, by a telephonic apparatus including an interface to a network, a memory adapted to store a telephone number, a text-to-speech module adapted to produce audible signals associated with the stored telephone number, a processor, and a local input unit. The local input unit is adapted to produce an input signal in response to user activation, and the processor is adapted to respond to the input signal by retrieving the stored telephone number from the memory and causing the text-to-speech module to produce the audible signals for transmission to the network via the interface.

In an alternative embodiment according to the invention, a method of transmitting Caller ID data to a distant party includes the steps of receiving a local input command, retrieving stored Caller ID data in response to the local input command, producing audible signals based on the retrieved Caller ID data, and transmitting the audible signals to the distant party.

BRIEF DESCRIPTION OF THE DRAWING

Objects and advantages of the invention will be apparent to one of skill in the art upon review of the following detailed description in light of the drawing, wherein.

DETAILED DESCRIPTION

Figure 1:
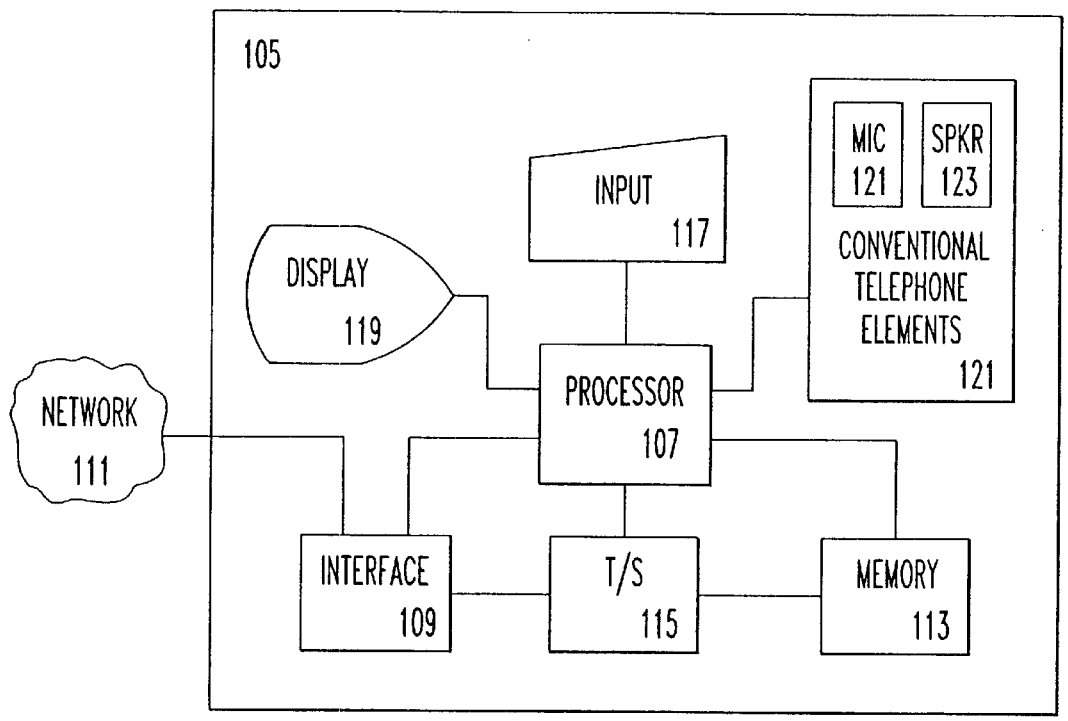
FIG. 1 is a simplified block diagram of an exemplary embodiment of a device according to the invention.

As shown in FIG. 1, a telephonic device or apparatus 105 includes a processor 107, such as an integrated circuit microcontroller or digital signal processor. An example of such a processor is the DSP1609 available from Lucent Technologies, Inc. The processor 107 is coupled to an interface 109, which provides a link to a network 111. For example, in one embodiment, the interface 109 is a telephone line interface, and the network 111 is the public switched telephone network. Alternative forms of network 111 are also possible, including, for example, internet-based networks and wireless networks, such as cellular networks.

The processor 107 is also coupled to a memory 113 and a text-to-speech module 115. The memory 113 may be an integrated circuit memory, such as a random access memory, comprising an integrated circuit chip, or may be realized as part of the same integrated circuit chip as the processor 107. Further, the memory 113 may be part of the processor 107, or may be part of a shared memory. Similarly, the text-to-speech module 115 may be realized in isolation or as a function block within the processor 107. Although memory 113 and text-to-speech module 115 may be part of processor 107, they are shown independently to ease an understanding of the various embodiments according to the invention.

The processor 107 is also coupled to an input unit 117. The input unit 117 may be, for example, a keypad, such as a telephone keypad, or may comprise any other method for a user to interact. For example, the input unit 117 may be a touchscreen, a joystick, a trackball, or any other type of physical transducer that produces an electrical signal in response to user interaction. Alternatively, the input unit 117 may comprise a transducer, such as a microphone, that is responsive to sounds incident thereon, and may include a voice and/or sound recognition module, which may be realized, for example, as a function block in processor 107.

According to the invention, an input is provided to the input unit 117, and this input causes the input unit 117 to produce an electrical signal. The processor 107 responds to this signal by retrieving information, such as a stored telephone number, from the memory 113, and forwarding the information to the text-to-speech module 115. The text-to-speech module 115 produces audible signals based on the information. These audible signals are transmitted over the network 111 via the interface 109 so that, for example, a distant party may hear them.

Thus, for example, if a user of device 105 is engaged in a telephone conversation with a distant party, and the distant party desires to know information, such as telephone numbers, that are stored in memory 113, then the user can transmit this information to the distant party by locating the proper information in memory 113 and activating the input unit 117 to cause the information to be transmitted in a form that is understandable by the distant party. Alternatively, the information can be transmitted in a form that is understandable by the distant party's telephone, such as DTMF, FSK, etc., and can be converted in the distant party's telephone into a form understandable by the distant party.

The input unit 117 may be employed to facilitate the process of locating the proper information, and this process may be further facilitated by use of a display 119. Display 119 may be, for example, a liquid crystal display. For example, the user may scroll through data, such as a plurality of stored telephone numbers, by activating one or more keys or portions of input unit 117 while observing corresponding images on display 119.

When the user is satisfied that an image on display 119 corresponds to information the user wants to transmit to the distant party, the user activates the input unit 117 in a particular manner, such as the pressing of a particular keypad key, to cause at least a portion of the imaged information to be converted to audible signals and transmitted to the distant party via the network 111 (or into electrical signals that may be understood by the distant party's telephone and converted therein into audible signals). The use of display 119 to provide feedback to the user during this process is purely by way of example, as other mechanisms for providing this feedback, such as audible announcements of the information, fall within the scope of the invention.

The device 105 may, in fact, be a telephone, such that it also includes conventional telephone elements 121. These elements include, for example, a speaker 123, which may exist in a handset of the telephone or in a portion of the telephone employed for speakerphone purposes. Further, if the input unit 117 does not comprise a microphone, then the conventional elements may also include a microphone 125, which may also be realized within a handset of the telephone or as part of a speakerphone embodiment thereof.

Figure 2:
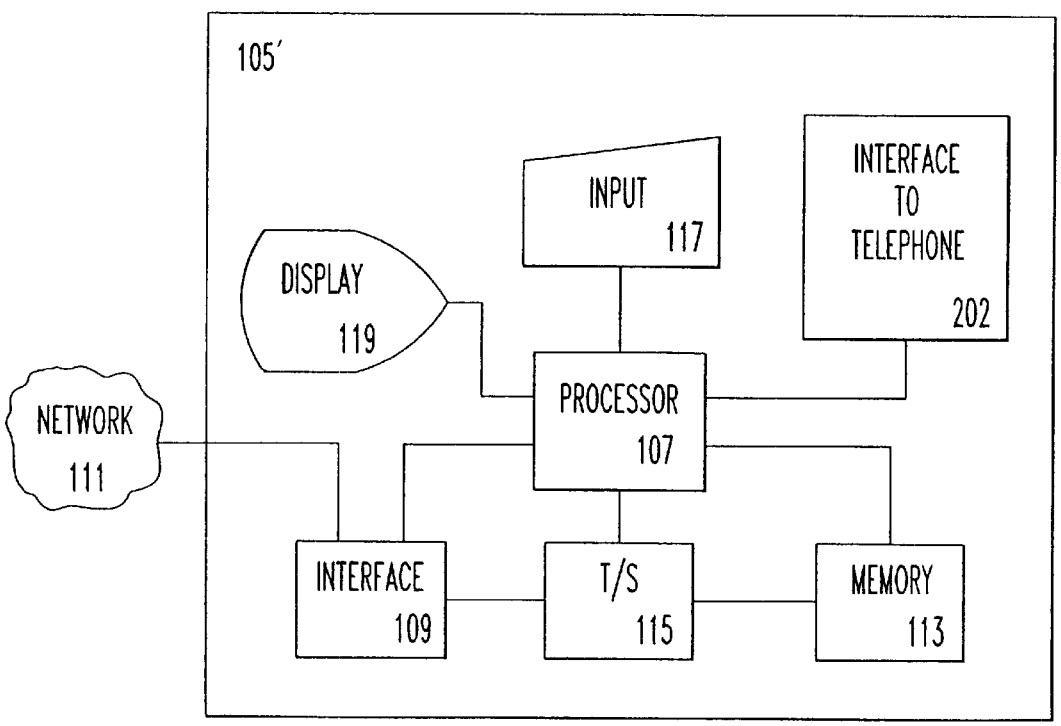
FIG. 2 is a simplified block diagram of an alternative embodiment of a device according to the invention.

Alternatively, as shown in FIG. 2 and depicted as device 105', the device may comprise an adjunct box or other form of independent unit that is coupled to a telephone. The device 105' thus includes interface 202 for coupling to the telephone. It is, of course, also possible for some elements of the device 105 to be realized as part of a telephone, while other parts of the device 105 are realized as part of an adjunct box. Regardless of the form taken, the inventive elements enable a user, while engaged in a telephone conversation, to look up data that are stored in memory 113, and easily cause audible signals associated with the data to be transmitted to a distant party, such as to another party involved in the conversation.

When the data are transmitted, they will also, in one embodiment, be audible locally to the user, such as by being broadcast from the speaker 123. This will enable the user to confirm that the proper data are transmitted and to confirm that the transmission is of satisfactory quality. If not, then the user may take remedial action. For example, the user can take steps to retrieve the correct data if the incorrect data were previously retrieved, or the user can elect to read the data to the distant party in a conventional manner if the audible quality is less than satisfactory.

It should also be recognized that the distant party need not be actively engaged in the on-going telephone call for the invention to be employed. For example, if the user wants to provide the distant party with information, such as one or more telephone numbers, associated with one or a plurality of people, the user may leave a voicemail message for the distant party, such as on an answering machine or within a voicemail service. While in an off-hook configuration and leaving the message, the user may employ the inventive concepts to transmit the data portion.

For example, the user may leave the message by 1) saying "here is Vinny's telephone number"; 2) activating the input unit 117 to cause Vinny's data to be converted to audible form (or into signals, such as DTMF, corresponding thereto) and transmitted; 3) saying "here is Christina's telephone number"; 4) activating the input unit 117 for Christina's data; 5) saying "here is Johnny's telephone number"; 6) activating the input unit 117 for Johnny, and acting likewise for Anthony, Darla, Micah, etc., and any other person whose data are stored and are to be transmitted, such as, for example, Briana. Thus, the distant party can receive the information and the burden on the user is advantageously reduced when compared to conventional methods of transferring the same information. Further, the likelihood of error is reduced as the user does not transcribe the information or try to memorize the information.

Figure 3:
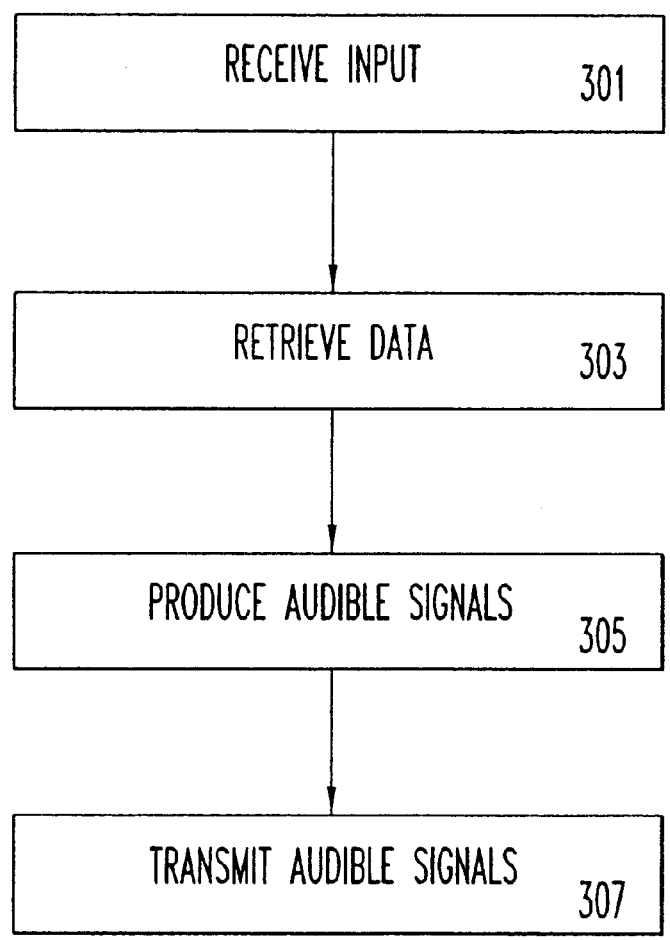
FIG. 3 is a simplified operational flowchart describing an alternative embodiment according to the invention.

FIG. 3 provides an exemplary flowchart of operation according to the invention. At step 301, an input command is received, for example, from the input unit 117. This input command may be, for example, a user activating a particular key of a keypad to instruct the device 105 to transmit the data presently displayed on display 119. The input unit 117 will create a corresponding signal and send it to the processor 107. At step 303, the processor 107 reacts to the received signal by retrieving the appropriate data from memory 113. At step 305, the text-to-speech module 115 receives the data and converts it to audible signals, and at step 307 the audible signals are transmitted to the network 111 via the interface 109, and hence to the distant party or any other party coupled to the network and authorized to receive the data.

The steps 303, 305 and 307 may involve communication between the processor 107 and each of the memory 113, text-to-speech module 115 and interface 109. For example, the processor 107 may retrieve the data from memory 113 and forward the data to the text-to-speech module 115, and may similarly retrieve the audible signals (or digital versions thereof) from text-to-speech module 115 and forward the audible signals (via a codec, or to a codec portion of interface 109, not shown, for example, if the retrieved signals are in digital form), to the interface 109. Alternatively, the processor 107 may merely facilitate direct communication between the memory 113 and text-to-speech module 115, and between the text-to-speech module 115 and the interface (and/or codec) 109.

Based on an understanding of these various embodiments, one of skill in the art is likely to conceive of alternative embodiments that are not specifically enumerated here, but that are clearly within the scope of the invention.

What is claimed is:

1. A telephonic apparatus, comprising:
   an interface to a telecommunications network
   a memory adapted to store a telephone number;
   a text-to-speech module adapted to produce audible signals associated with the stored telephone number;
   a processor; and
   a local input unit,
   wherein the local input unit is adapted to produce a keyed input signal in response to user activation, and the processor is adapted to respond to the input signal by retrieving the stored telephone number from the memory and causing the text-to-speech module to produce the audible signals for transmission to the telecommunications network via the interface.

2. A telephonic apparatus as recited in claim 1, wherein the local input unit comprises a keypad.

3. A telephonic apparatus as recited in claim 1, wherein the local input unit comprises a voice recognition module adapted to be respond to voice commands from the user.

4. A telephonic apparatus as recited in claim 1, further comprising an interface to a telephone.

5. A telephonic apparatus as recited in claim 1, further comprising conventional elements of a telephone.

6. A telephonic apparatus as recited in claim 1, wherein the memory comprises a Caller ID memory.

7. A telephonic apparatus as recited in claim 1, wherein the memory comprises a speed dial memory.

8. A telephonic apparatus according to claim 1, wherein said telecommunications network comprises at least one of:
   a PSTN;
   a data network; and
   an Internet.

9. A telephone, comprising:
   an interface to a telecommunications network
   a microphone;
   a speaker;
   a processor;
   a keypad;
   a text-to-speech module; and a memory,
   wherein the processor is adapted to respond to input received from one of the keypad and the microphone by retrieving a telephone number from the memory and forwarding the telephone number to the text-to-speech module, and
   wherein the text-to-speech module is adapted to produce audible signals based on the received telephone number, and to provide the audible signals to the interface for transmission over the telecommunications network.

10. A telephone as recited in claim 9, wherein the memory comprises a speed dial memory.

11. A telephone as recited in claim 9, wherein the memory comprises a Caller ID memory.

12. The telephone according to claim 10, wherein said telecommunications network comprises at least one of:
    a PSTN;
    a data network; and
    an Internet.

13. The telephone according to claim 10, wherein said telecommunications network comprises at least one of:
    a PSTN;
    a data network; and
    an Internet.

14. A Caller ID device, comprising:
    a first interface to a telecommunications network;
    a second interface to a telephone;
    a display;
    a processor;
    a keypad;
    a memory; and
    a text-to-speech module,
    wherein the processor is adapted to retrieve Caller ID date from the memory in response to activation of the keypad, and to provide the Caller ID data to the text-to-speech module, and
    wherein the text-to-speech module is adapted to produce audible signals based on the received Caller ID data, and to provide the audible signals to the interface for transmission over the telecommunications network.

15. A Caller ID device as recited in claim 14, wherein the Caller ID data comprises a telephone number.

16. A Caller ID device as recited in claim 15, wherein the Caller ID data comprises a name associated with the telephone number.

17. The Caller ID device according to claim 14, wherein said telecommunications network comprises at least one of:

a PSTN;

a data network; and an Internet.

18. A method of transmitting Caller ID data to a distant party from a terminal device, comprising the steps of:

receiving a local keyed input command;

retrieving stored Caller ID data in response to the local input command;

producing audible signals based on the retrieved Caller ID data using text-to-speech; and transmitting the audible signals from the terminal device to the distant party over a telecommunications network.

19. A method as recited in claim 18, wherein the stored Caller ID data comprises a telephone number.

20. A method as recited in claim 19, wherein the stored Caller ID data comprises a name associated with the telephone number.

21. A method as recited in claim 18, wherein the transmitting step comprises transmitting via a network.

22. A method as recited in claim 18, wherein the receiving, retrieving, producing and transmitting steps occur while an on-going telephone call is in place with the distant party.

23. A method as recited in claim 18, wherein the retrieving and producing steps occur a plurality of times, and wherein the transmitting step comprises transmitting a plurality of Caller ID data.

24. A method as recited in claim 23, wherein the receiving step occurs a plurality of times such that each occurrence of the retrieving and producing steps is responsive to a corresponding occurrence of the receiving step.

25. The method of transmitting Caller ID data to a distant party according to claim 8, wherein said telecommunications network comprises at least one of:

a PSTN, a data network; and an Internet.

* * * * *